United States Patent [19]
Walsh

[11] Patent Number: 5,261,443
[45] Date of Patent: Nov. 16, 1993

[54] WATERSAVING RECIRCULATING SYSTEM

[76] Inventor: Paul F. Walsh, 8 Edwards Rd., Braintree, Mass. 01284

[21] Appl. No.: 411

[22] Filed: Jan. 4, 1993

[51] Int. Cl.$^5$ .............................................. F24H 1/00
[52] U.S. Cl. .................................. 137/337; 126/362; 417/32
[58] Field of Search ............... 137/1, 337; 126/362; 417/32

[56] References Cited

U.S. PATENT DOCUMENTS

| | | | |
|---|---|---|---|
| 3,776,261 | 12/1973 | Houghton | 137/337 |
| 3,799,181 | 3/1974 | Maddren | 137/337 |
| 4,606,325 | 8/1986 | Lujan, Jr. | 417/32 |
| 4,738,280 | 4/1988 | Oberholtzer | |
| 4,798,224 | 1/1989 | Haws | |
| 5,009,572 | 4/1991 | Imhoff et al. | 417/32 |
| 5,042,524 | 8/1991 | Lund | |
| 5,072,717 | 12/1991 | Laing et al. | |
| 5,105,846 | 4/1992 | Britt | 137/337 |

Primary Examiner—A. Michael Chambers
Attorney, Agent, or Firm—Henderson & Sturm

[57] ABSTRACT

A water saving recirculating system (10) for a conventional water supply system (100) wherein: a fluid coupling (14) and solenoid valve (15) are disposed intermediate the hot water feed line (106) and a first cold water feed line (102); a one way check valve (11) is disposed in the cold water supply line (101); and, a pump (13) disposed in the first cold water feed line (102) for reversing the fluid flow through the first cold water feed line (102); wherein, the flow of water through the hot water feed line (106) is diverted through the first cold water feed line (102) until such time as the temperature of the water flowing through the hot water line (106) reaches a predetermined valve.

5 Claims, 1 Drawing Sheet

WATERSAVING RECIRCULATING SYSTEM

BACKGROUND ART

This invention was the subject matter of Document filed in the United States Patent and Trademark Office on Apr. 27, 1992.

As can be seen by reference to the following U.S. Pat. Nos. 4,798,224; 4,738,280; 5,042,524; and 5,072,717; the prior art is replete with myriad and diverse water conservation systems.

While all of the aforementioned prior art constructions are more than adequate for the basic purpose and function for which they have been specifically designed, these patented arrangements are uniformly deficient with respect to their complexity and/or need to substantially modify the existing water circulation systems to accommodate the water conserving apparatus.

As everyone is aware a tremendous amount of fresh water is wasted each day due to the time delay which occurs between the opening of the hot water tap and the time that the water issuing from the tap reaches the desired temperature.

As a consequence of the foregoing situation, there has existed a longstanding need among the worlds population for a simple and effective system for recovering the water that is normally wasted which people wait for hot water to be delivered from the hot water tap; and, the provision of such a construction is a stated objective of the present invention.

DISCLOSURE OF THE INVENTION

Briefly stated, the watersaving recirculating system that forms the basis of the present invention requires only minimal modification of the existing conventional water circulation system.

In essence this system involves the temporary recirculation of the hot water supply through the cold water supply line until such time as the temperature of the hot water flowing past the hot water outlet reaches a predetermined level; at which point the reverse circulation through the cold water supply line is terminated.

As will be explained in greater detail further on in the specification, the recirculating system of this invention comprises a minimum number of components that are installed in the existing cold water supply line as well as the formation of a branched fluid connection between the existing hot water and cold water lines.

BRIEF DESCRIPTION OF THE DRAWINGS

These and other attributes of the invention will become more clear upon a thorough study of the following description of the best mode for carrying out the invention, particularly when reviewed in conjunction with the drawings, wherein.

BEST MODE FOR CARRYING OUT THE INVENTION

Figure 1:
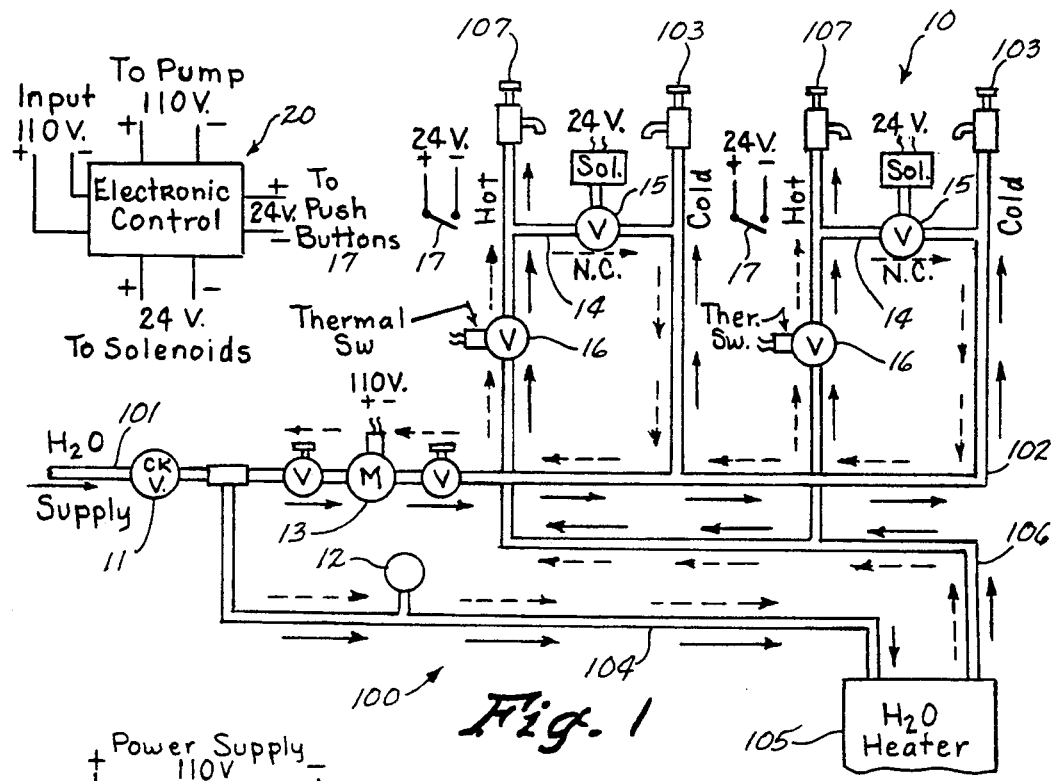
FIG. 1 is a schematic diagram of the water saving recirculating system that forms the basis of the present invention; and, FIG. 2 is a circuit diagram of the electrical controls which govern the operation of the recirculating system.

As can be seen by reference to the drawings, and in particular to FIG. 1, the water saving recirculating system that forms the basis of the present invention is designated generally by the reference numeral (10). As mentioned previously the recirculating system (10) is designed to be incorporated into a conventional water supply system designated generally as (100) which comprises: a cold water supply line (101) a first cold water feed line (102) to a cold water tap (103); a second cold water feed line (104) to a hot water heater (105); and, a hot water feed line (106) to a hot water tap (107).

To begin with the recirculating system (10) of this invention requires the modification of the conventional water supply system in the following manner.

First of all a one-way check valve (11) is inserted into the cold water supply line (101) upstream of, but proximate to, the branching of the first (102) and second (104) cold water feed lines.

Then a water hammer suppressor (12) is introduced into either the first (102) or second (104) cold water feed lines proximate to their branched connection. A pump (13) is then connected to the first cold water feed line (102) for reversing the flow of water through this feed line; wherein, the fluid pressure generated by the pump will cause the one-way check valve (11) to close.

At this juncture a branched fluid coupling (14) is established between the hot water feed line (106) and the first cold water feed line (102) proximate to the hot (107) and cold (103) water taps. In addition a normally closed solenoid actuated valve (15) is disposed in the fluid coupling (14) for reasons that will be explained presently.

Furthermore, a thermally actuated switch (16) is disposed in the hot water feed line (10) proximate to, but downstream of the juncture of the fluid coupling (14) with the hot water feed line (106); wherein the thermal switch (16) is electrically connected to the electronic control (20) to shut down the system when a predetermined temperature is reached in the water flowing through the hot water line.

Figure 2:
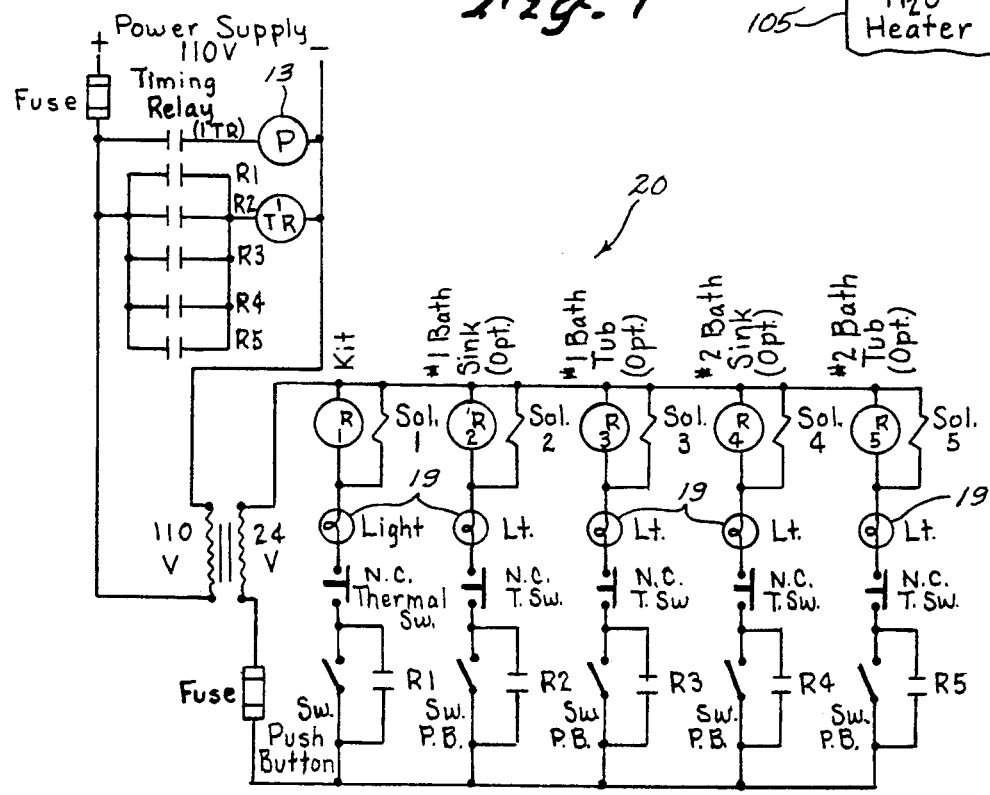

As shown in FIGS. 1 and 2, electrical control circuitry designated generally as (20) is provided between the solenoid actuated valve (15), the thermal switch (16) and the pump (13); wherein a push button switch (17) governs the operation of the system (10).

When a user wishes to employ the recirculation system (10) the push button switch (17) is depressed which causes the solenoid actuated valve (15) to open and the pump (13) to be energized. The pump (13) then reverses the flow through the first cold water feed line (102); wherein, the closed loop fluid system is designated by the dashed arrows in FIG. 1.

This reversal of flow causes the one way check valve (11) to close such that the hot water supply will be diverted through the fluid coupling (14) and into the first cold water feed line (102) until the thermal switch (16) has reached a pre-determined value.

At this juncture the thermal switch (16) causes the pump (13) to stop and the solenoid valve (15) to close; wherein, the pressure in the main cold water supply line (101) will cause the one-way valve to open thereby restoring the conventional water supply system.

It should also be noted at this juncture that this recirculation system (10) also contemplates the provision of indicator lights (19) to inform the user when the hot water recirculating system is in use, at the tap (107).

In this manner, there is no wastage of fresh water while the user is waiting for hot water to be delivered, and a tremendous saving in a precious natural resource is accomplished.

Having thereby described the subject matter of the present invention, it should be apparent that many substitutions, modifications and variations of the invention are possible in light of the above teachings. It is therefore to be understood that the invention as taught and described herein is only to be limited to the extent of the breadth and scope of the appended claims.

I claim:

1. A water saving recirculating system for use with a conventional water supply including: a main cold water supply line; a first cold water feed line to a cold water tap; a second cold water feed line to a water heater; a fluid juncture between said first and second cold water feed lines and, a hot water feed line to a hot water tap; wherein, the recirculating system consist of:
 - a fluid coupling between said first cold water feed line and said hot water feed line;
 - a first valve disposed in said fluid coupling;
 - a second valve disposed in said cold water supply line upstream of said fluid juncture; and
 - a pump disposed in said first cold water feed line at a point normally located upstream from said fluid coupling; wherein, the actuation of the pump reverses the flow of water through said first cold water feed line.

2. The recirculating system as in claim 1; wherein, said second valve comprises a one-way check valve.

3. The recirculating system as in claim 1; wherein, said first valve comprises a solenoid actuated normally closed valve.

4. The recirculating system as in claim 3; further comprising;
 - a thermally actuated switch disposed in said hot water feed line; wherein, the thermally actuated switch is operatively connected to the pump and the solenoid actuated valve.

5. The recirculating system as in claim 4; further including;
 - a push button switch operatively connected to the pump and the solenoid actuated valve.

* * * * *